(12) United States Patent
Xia et al.

(10) Patent No.: US 10,671,420 B2
(45) Date of Patent: Jun. 2, 2020

(54) SYSTEM AND METHOD FOR DYNAMIC VIRTUALIZED NETWORK FUNCTION DESCRIPTOR MANAGEMENT

(71) Applicant: Futurewei Technologies, Inc., Plano, TX (US)

(72) Inventors: Haitao Xia, Shenzhen (CN); Zhixian Xiang, Frisco, TX (US); Xu Yang, Beijing (CN)

(73) Assignee: Futurewei Technologies, Inc., Plano, TX (US)

( * ) Notice: Subject to any disclaimer, the term of this patent is extended or adjusted under 35 U.S.C. 154(b) by 720 days.

(21) Appl. No.: 15/150,238

(22) Filed: May 9, 2016

(65) Prior Publication Data
US 2016/0328259 A1 Nov. 10, 2016

Related U.S. Application Data

(60) Provisional application No. 62/158,276, filed on May 7, 2015, provisional application No. 62/158,381, filed on May 7, 2015.

(51) Int. Cl.
*G06F 9/455* (2018.01)
*H04L 12/24* (2006.01)
*H04L 29/06* (2006.01)

(52) U.S. Cl.
CPC ...... *G06F 9/45558* (2013.01); *H04L 41/0813* (2013.01); *H04L 41/0896* (2013.01);
(Continued)

(58) Field of Classification Search
CPC . H04L 41/0843; H04L 49/70; H04L 67/1097; H04L 41/082; H04L 41/28;
(Continued)

(56) References Cited

U.S. PATENT DOCUMENTS

| 5,819,047 A | 10/1998 | Bauer et al. |
| 8,122,110 B1 | 2/2012 | Wilbur et al. |

(Continued)

FOREIGN PATENT DOCUMENTS

| CN | 104050045 A | 9/2014 |
| CN | 104253866 A | 12/2014 |

(Continued)

OTHER PUBLICATIONS

ETSI GS NFV-INF 001 V1.1.1, "Network Functions Virtualisation (NFV); Infrastructure Overview," Jan. 2015, 60 pages, Sophia Antipolis Cedex, France.

(Continued)

*Primary Examiner* — Kyung H Shin
(74) *Attorney, Agent, or Firm* — Slater Matsil, LLP

(57) ABSTRACT

A Virtual Network Function Descriptor (VNFD) parameter may include subfields that allow a management entity to determine whether the VNFD parameter can be updated. The subfields may include a write-ability subfield that indicates whether the VNFD parameter is a dynamic/configurable VNFD parameter or a fixed/static VNFD parameter. The VNFD parameter may also include an access permission subfield that indicates which entities are authorized to modify/update the VNFD parameter. The VNFD parameter may also include an administrative priority subfield that indicates a priority of an entity that set an attribute of the VNFD parameter. The VNFD parameter may also include a constraints subfield that indicates one or more conditions that are required to occur in order for the VNFD parameter to be updated.

32 Claims, 8 Drawing Sheets

(52) U.S. Cl.
CPC ............ *H04L 41/28* (2013.01); *H04L 63/102* (2013.01); *G06F 2009/4557* (2013.01); *G06F 2009/45595* (2013.01); *H04L 63/0892* (2013.01)

(58) Field of Classification Search
CPC ............... H04L 41/0813; H04L 63/102; H04L 63/0892; H04L 41/0896; G06F 3/0607; G06F 3/0631; G06F 9/45533; G06F 9/5097; G06F 9/541; G06F 9/45558; G06F 2009/45595; G06F 2009/4557
See application file for complete search history.

(56) References Cited

U.S. PATENT DOCUMENTS

| | | |
|---|---|---|
| 2002/0099835 A1 | 7/2002 | Chen |
| 2004/0030702 A1 | 2/2004 | Houston et al. |
| 2004/0210623 A1 | 10/2004 | Hydrie et al. |
| 2008/0021985 A1* | 1/2008 | Belgaied ............... H04L 41/082 709/221 |
| 2010/0165877 A1* | 7/2010 | Shukla ................ H04L 41/0843 370/254 |
| 2012/0047501 A1* | 2/2012 | Box .................... G06F 9/45533 718/1 |
| 2012/0263191 A1* | 10/2012 | Baron ................. H04L 67/1097 370/462 |
| 2014/0201374 A1 | 7/2014 | Ashwood-Smith et al. |
| 2015/0063166 A1 | 3/2015 | Sif et al. |
| 2015/0082308 A1 | 3/2015 | Kiess et al. |
| 2015/0109967 A1 | 4/2015 | Hogan et al. |
| 2016/0234082 A1 | 8/2016 | Xia et al. |

FOREIGN PATENT DOCUMENTS

| | | |
|---|---|---|
| CN | 104468688 A | 3/2015 |
| JP | 2012227705 A | 11/2012 |
| JP | 2015056182 A | 3/2015 |
| RU | 2382398 C2 | 2/2010 |
| WO | 2014086978 A1 | 6/2014 |
| WO | 2015058626 A1 | 4/2015 |

OTHER PUBLICATIONS

GS NFV-MAN 001 V05.0, "Network Functions Virtualization (NFV) Management and Orchestration," ETSI, May 2014, 198 pages, Sophia Antipolis Cedex, France.

ETSI GS NFV-MAN, "Network Functions Virtualisation (NFV); Management and Orchestration", ETSI, Dec. 2014, V1.1.1, 16 pages.

Kaneko, M., "a robust VNF allocation method in NFV", Institute of Electronics, Information and Communication Engineers (IEICE) Technical Report, General Corporate Judicial Person IEICE, vol. 114, No. 400, 19 pages, Japan.

* cited by examiner

SYSTEM AND METHOD FOR DYNAMIC VIRTUALIZED NETWORK FUNCTION DESCRIPTOR MANAGEMENT

This application claims the benefit of U.S. Provisional Application No. 62/158,276, filed on May 7, 2015 and U.S. Provisional Application No. 62/158,381 filed on May 7, 2015, both of which are hereby incorporated by reference herein as if reproduced in their entireties.

TECHNICAL FIELD

The present invention relates to a system and method for network virtualization, and, in particular embodiments, to a system and method for dynamic virtualized network function virtualization management.

BACKGROUND

Network function virtualization (NFV) is an industry effort to virtualize network equipment using generic-build hardware platforms, with the goals of cost reduction and efficient/agile network operation and performance. Conceptually speaking, NFV is the principle of separating network functions from the hardware they run on using virtual hardware abstraction, and seeks to virtualize entire classes of network node functions into building blocks that may be connected, or chained, together to create communication services.

SUMMARY

Technical advantages are generally achieved, by embodiments of this disclosure which describe systems and methods for dynamic virtualized network function descriptor management.

In accordance with an embodiment, a method for dynamically configuring virtual network function (VNF) parameters is provided. In this example, the method comprises receiving a VNF descriptor (VNFD) associated with a VNF or VNF instance at a management entity. The VNFD lists a set of parameters describing characteristics of the VNF or VNF instance. The method further includes determining whether a VNFD parameter in the VNFD can be dynamically updated according to one or more sub-fields of the VNFD parameter or according to an information element listing dynamically configurable VNFD parameters, and dynamically updating the VNFD parameter upon determining that the VNFD parameter can be dynamically updated. An apparatus for performing this method is also provided.

In accordance with another embodiment, a method for managing virtual network function (VNF) resource allocations is provided. In this example, the method comprises receiving a quota information notification from a network function virtualization operator (NFVO) at a VNF Manager (VNFM). The quota information notification corresponds to a quota allocated to the VNFM or to one or more VNF instances managed by the VNFM. The method further includes sending a quota management request to the NFVO to update, or request information pertaining to, the quota initially set by the NFVO, and receiving a response to the quota management request from the NFVO. An apparatus for performing this method is also provided.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
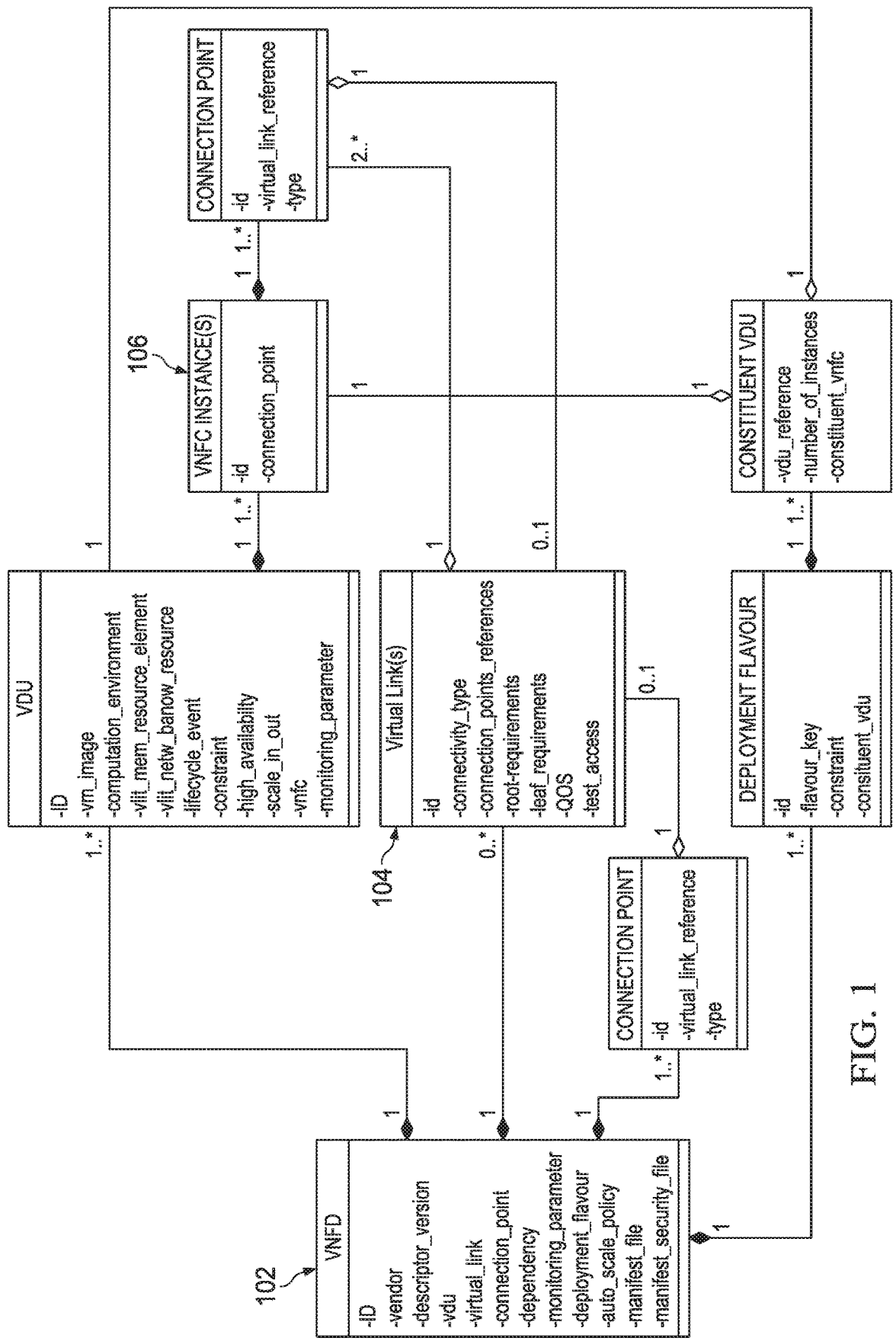
FIG. 1 illustrates is a block diagram of an embodiment virtual network function descriptor (VNFD)

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

A Virtual Network Function (VNF) is a virtualized task that has been moved from dedicated hardware to software. A VNF Descriptor (VNFD) may include a set of parameters describing characteristics and/or attributes of a VNF instance. A VNFD may be used by a Network Function Virtualization Orchestrator (NFVO) to instantiate a virtual machine, corresponding to the VNF instance, on a host device. The NFVO is a software package that acts as an arbitrator for resource provisioning between VNFs. An NFVO may trigger instantiation of VMs corresponding to a VNF instance on different host devices.

In conventional NFV systems, the parameters of a VNFD are statically defined. However, in some instances, it may be desirable to update a VNFD to reflect a new, or changed, characteristic and/or attribute of a VNF instance, such as may occur when a VNF instance is updated by a vendor or operator. Accordingly, techniques for updating VNFDs are desired.

Embodiments of this disclosure provide a VNFD parameter format that includes subfields that allow a management entity to determine whether the VNFD parameter can be updated. The subfields may include a write-ability subfield, an access permission subfield, an administrative priority subfield, and/or a constraints subfield. The parameter subfield indicates a name of the VNFD parameter. The writeability subfield indicates whether the VNFD parameter is a dynamic/configurable VNFD parameter or a fixed/static VNFD parameter. Dynamic/configurable VNFD parameters are writeable, meaning that they are capable of being dynamically updated. Static VNFD parameters are read only. The administrative priority subfield indicates the priority of the most recent entity to update the subfield. The constraints subfield indicates one or more conditions that are required to occur in order for the VNFD parameter to be updated. For example, the constraints field could require that a VNF instantiation and lifecycle management (LCM) event, or an onboarding event, occurred within a threshold period of time.

A management entity may determine whether a VNFD parameter can be dynamically updated according to one or more sub-fields of the VNFD parameter and/or according to an information element listing dynamically configurable VNFD parameters. In one embodiment, the management entity determines whether the VNFD parameter is a configurable VNFD parameter or a fixed VNFD parameter according to a sub-field of the VNFD parameter that indicates whether or not the VNFD parameter can be re-configured.

In another embodiment, the management entity determines whether the VNFD parameter is a configurable VNFD parameter according to whether the VNFD parameter is listed by the information element listing dynamically configurable VNFD parameters. The information element may be a VnfConfigurableProperties information element that defines configurable properties of a VNF or VNF instance. In another embodiment, the management entity determines whether the management entity has been authorized to update the VNFD parameter according to an access permission sub-field of the VNFD parameter. The access permission subfield may identify which entities are permitted to update the VNFD parameter. In another embodiment, the management entity determines whether an attribute of the VNFD parameter can be modified by the management entity according to an administrative priority sub-field of the VNFD parameter. The administrative priority subfield may indicate an administrative priority of an entity that set the attribute of the VNFD parameter. The management entity may be permitted to modify the attribute when the management entity has a higher administrative priority than the entity that previously set the attribute of the VNFD parameter. In yet another embodiment, the management entity determines whether the VNFD parameter can be dynamically updated when one or more conditions specified by a constraints sub-field of the VNFD parameter have occurred within a threshold period of time.

The VNFD parameter may be updated/modified to reflect a modification to a characteristic of the VNF or VNF instance. For example, the VNFD parameter may be updated to reflect an increase or a decrease in a number of virtual deployment units (VDUs), a number of virtual links, or a number of connection points in the VNF or VNF instance. As another example, the VNFD parameter may be updated to reflect an increase or decrease in a resource quota of the VNF or VNF instance, the resource quota specifying a maximum number of resources that can be allocated to the VNF or VNF instance. The management entity may be a network function virtualization operator (NFVO), an Operational Support System (OSS) function, an Authentication, Authorization, and Accounting (AAA) function, or a VNF manager (VNFM).

Embodiments of this disclosure further provide a technique for managing quotas. In an embodiment, a VNF Manager (VNFM) may receive a quota information notification from a network function virtualization operator (NFVO). The quota information notification may correspond to a quota allocated to the VNFM or to one or more VNF instances managed by the VNFM. The VNFM may then send a quota management request to the NFVO. The quota management request may request an update to the quota initially set be the NFVO. Alternatively, the quota management request may request information pertaining to the quota.

In one embodiment the quota management request queries updated quota information that indicates if there are any changes to the quota allocated to the VNFM or to the one or more VNF instances managed by the VNFM. In another embodiment, the quota management request requests an increase or a decrease in the quota. In yet another embodiment, the quota management request requests deletion of the quota.

The quota notification information from the NFVO may indicate whether quotas are available to the VNFM or to one or more VNF instances managed by the VNFM. A quota may specify a maximum number of computer resources that are permitted to be allocated to the VNFM or to the one or more VNF instances managed by the VNFM. For example, a quota may specify a maximum number of virtual machines (VMs) or CPU processes that are permitted to be instantiated by the VNFM or for one or more VNF instance(s) managed by the VNFM. As another example, the quota may specify a maximum storage capacity that is permitted to be allocated to the VNFM or to one or more VNF instances managed by the VNFM.

Alternatively, a quota may specify a maximum network resource capacity that is permitted to be allocated to the VNFM or to one or more VNF instances managed by the VNFM. As yet another alternative, a quota may specify a resource type, class, or level that is permitted to be allocated to the VNFM or to one or more VNF instances managed by the VNFM. For example, a quota may specify that only gold-class resources may be allocated to the VNFM or to one or more VNF instances managed by the VNFM. The quota information notification, quota management request, and/or the response may be exchanged over a Virtualized Resources Quota management Interface.

In some embodiments, an NFVO may dynamically update a dynamically configurable VNFD parameter upon receiving a request to do so from another entity, such as an Authentication, Authorization, and Accounting (AAA) function, an Operational Support System (OSS) function, or a VNF Manager (VNFM) function. In some embodiments, the NFVO may update the VNFD only when one or more constraints specified by the VNFD parameter are satisfied. For example, the NFVO may only update the VNFD parameter when the sender of the update request has permission to modify the VNFD parameter. Entities that have permission to modify a VNFD parameter may be listed in an administrative entity field of the VNFD parameter. In other embodiments, the NFVO may update the VNFD only when the sender of the request has a higher administrative priority than an entity that most recently requested modification of the corresponding parameter. The priority classification of the most recent entity to update a parameter may be listed in a prioritized administrative entity field of the VNFD parameter. In yet another embodiment, the NFVO may update the VNFD only when one or more constraints/conditions specified by the VNFD have occurred within a threshold period of time from when the request was received by the NFVO. Those constraints/conditions may be specified in a constraints field of the VNFD parameter. Dynamic configurable VNFD parameters may include, for example the number of Virtual Deployment Units (VDUs) in a VNF instance (configurable within a value range or between a maximum and minimum number), the number of virtual links in a VNF instance, the number of connection points in a VNF instance, a quota number of virtual resources, or a tenant ID of virtual resources.

In various embodiments, the system is capable of using a single file to store a dynamically changing VNFD. For example, a set of multiple files containing VNF parameters may be provided by a VNF vendor as part of a VNF software package. The system may also be capable of extracting parameters from each of these multiple files and combining them together into a single consolidated VNFD file, which is then used to configure the instantiation of the VNF. For example, the NFVO may be a centralized control point for authorizing access to the dynamic VNFD parameters to ensure that multiple entities can configure VNF parameters in a single file.

In the VNFD there are also indications of whether parameters are static (read-only access) or dynamically configurable (read-write access), which entities have read-write access and, in case of multiple entities having read-write access, priority of access and also any conditions or constraints that limit the scope of a parameter. One example of such constraints is that a certain parameter applies only when a target device is in a particular geographic location (as in, e.g., geographic licensing). Another example of a parameter constraint is that a certain parameter applies only when a VNF has a particular status, such as, e.g., when the VNF is under a suspend status or overload status. In some embodiments, a write qualifier field for a VNFD parameter may indicate whether or not the VNFD parameter is dynamic configurable.

In various embodiments, the system also includes a VNFM that is a logically separate entity from the NFVO that may or may not be in the same physical node as the NFVO. In an example, the NFVO may arbitrate M2M management resources of an M2M service that may use different VNFs to form the service, e.g., in a layer architecture.

In a first NFV quota solution, the NFVO is aware of the quota and enforces the quota, while the VNFM only follows the instructions without being involved in quota operation. In some implementation cases, however, the VNFM conducts resource management, and the VNFM has better intelligence than the NFVO on how to manage resources for its VNF(s). In such cases, a NFVO-centric quota solution limits the possibility to have better resource management.

Instead, in an embodiment second solution, a quota is posted by the virtualized infrastructure manager (VIM) for its tenant, so it has no knowledge of who that tenant is. Therefore, the VNFM can conduct quota management because the VNF(s) are the tenant of the Network Function Virtualized Implementation (NFVI). The VNFM receives quota information from the NFVO through a grant operation or dedicated resource notification or query interface, then the VNFM requests a resource from the VIM according to the quota.

In such embodiments, a quota negotiation and notification mechanism may be provided between the VNFM and the NFVO. When the VIM notifies a resource change or some resource policies are triggered, the NFVO will send a notification to the VNFM to change the quota. This resource notification interface can be used to deliver resource allocation information for both reservation and quota based solutions. The VNFM also has the additional capability to request expansion/contraction of the quota or negotiate with NFVO. In some embodiments, different tiers or types of quota may be available for the VNFM to select, e.g., Quota tier 1, with 10 Virtual Machines (VM), Quota 2 with 20 VM, etc. Additional VMs may be, for example, duplicate copies of a VNF that are added to handle increased traffic.

In some embodiments, meeting a quota threshold triggers the VNFM to send a grant/quota change request to the NFVO instead of sending a request to the VIM for additional resource allocation. In some embodiments where the NFVO conducts resource management and allocation using the quota, a quota query interface is provided in the NFVO (producer), where the VNFM can query the quota information in order to configure the VNFC in a more optimized way before instantiation, such as instantiating a different VNFC based on the quota resource. In some embodiments, a quota usage notification interface for the VNFM or VIM is provided to notify the NFVO about quota consumption status.

FIG. 1 is a block diagram illustrating an embodiment VNFD 102 that is a deployment template describing a VNF in terms of its deployment and operational behavior requirements. The VNFD 102 is primarily used by a VNFM in the process of VNF instantiation and lifecycle management (LCM) of a VNF instance. The information in the VNFD 102 is also used by the NFVO to manage and orchestrate network services (NSs) and virtualized resources on the Network Function Virtualized Implementation (NFVI).

The VNFD 102 also contains connectivity, interface and key performance indicators (KPIs) requirements that can be used by NFV-management and orchestration (NFV-MANO) functional blocks to establish appropriate virtual link(s) 104 within the NFV infrastructure (NFVI) between its VNF component (VNFC) instance(s) 106, or between a VNFC instance 106 and the endpoint interface to the other network services.

VNFD parameters in some examples describe a VNF in terms of VNF deployment and operational behavior. Example VNFD parameters may include a Static (pre-configured in the VNFD) indicator, a VNFD ID, a Vendor identifier, a VNFD version, a Virtualized deployment unit (VDU), a Virtual Link, a Connection Point, a Lifecycle Event, a Dependency, a Monitoring parameter, a Deployment flavor, an Auto scale policy, a Manifest file, and a Manifest security file.

It should be understood that additional or alternative VNFD components are contemplated and are within the scope of the description and claims.

Figure 2:
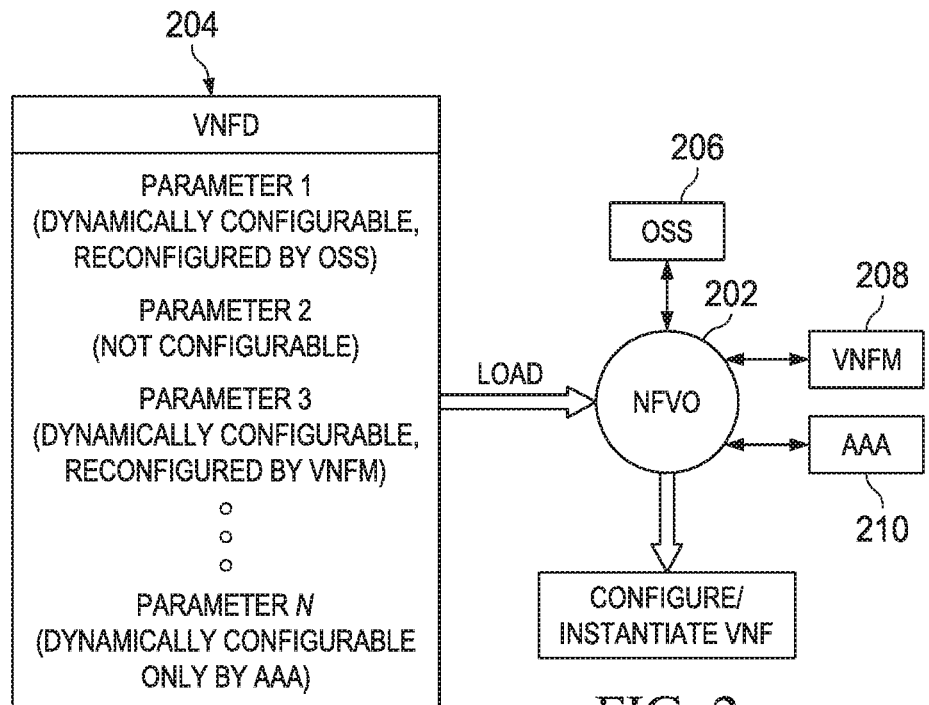
FIG. 2 illustrates is a block diagram of another embodiment virtual network function descriptor (VNFD)

FIG. 2 is a block diagram illustrating an embodiment VNFD 204 that provides operator(s) a mechanism for customizing the VNFD 204 in different scenarios of VNF lifecycle management by using dynamic parameters in the VNFD 204, instead of only static parameters. Static parameters are read-only. Static parameters generally are preconfigured by the operator or VNF provider in the VNFD design phase, are never updated during the VNF LCM procedures, and can only be changed with a VNFD update. Each dynamic parameter is configured with a default value or value range during the VNFD design phase, and can be updated to a workable value during the subsequent VNF instantiation or other LCM procedures. Dynamic parameters are read-writable.

With access to the VNFD 204 mediated by the NFVO 202, the OSS 206, VNFM 208, and AAA 210 provide parameter inputs dynamically during VNF operation, such that this input fills in the value of the parameter in the VNFD 204. Examples of dynamic parameters in VNFD 204 include a Number of VDUs in a VNF instance (in value range or maximum/minimum number), a Number of Virtual Links in a VNF instance, a Number of Connection Points in a VNF instance, a Quota number of virtual resources, and a Tenant ID(s) of virtual resources.

In accordance with an embodiment, for each parameter in the VNFD 204, some attributes are added to the parameter. A readability attribute is read-only for static parameters, and read-writable for dynamic parameters. The attribute can be settable by the operator, or similar parameters may indicate if this parameter is statically configured in the design phase or can be dynamically changed during VNF operations.

On processing each dynamic parameter (read-writable), the VNFM 208 can determine the Operations, Administration and Management (OAM) entity (e.g. NFVO/specific VNFM (S-VNFM)/generic-VNFM (G-VNFM)/element manager (EM) of the VNF) or a list of OAM entities that has the capability to modify the dynamic parameter.

For each dynamic parameter, if multiple entities can modify the dynamic parameter, the VNFM can determine the entity with the highest priority to modify the dynamic parameter when there is a conflict in parameter modification.

An embodiment provides conditions or constraints under which the modification of a dynamic parameter may be allowed.

Figure 3:
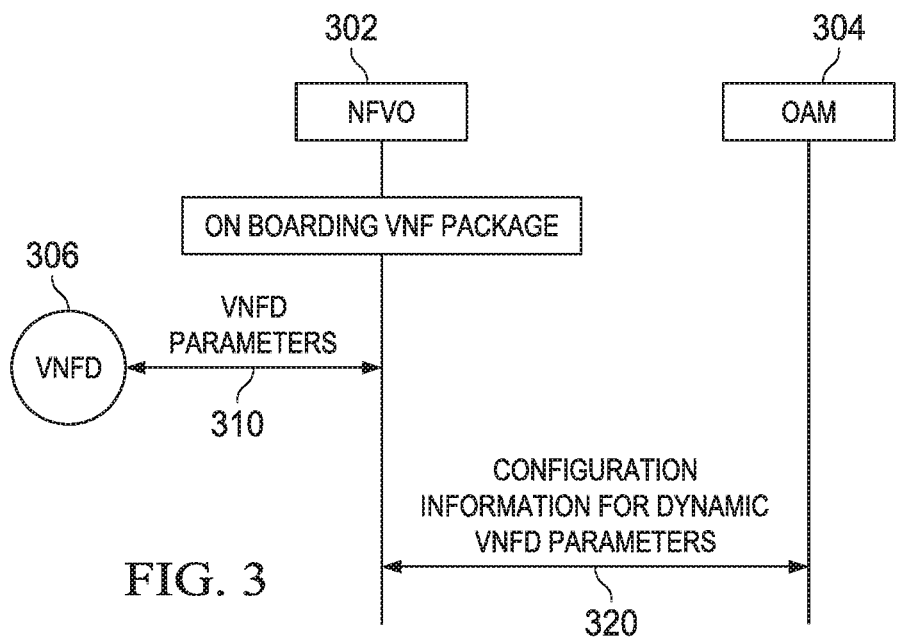
FIG. 3 illustrates a protocol diagram of an embodiment communications sequence for activating a VNF package.

FIG. 3 illustrates a protocol diagram of an embodiment communications sequence for activating a VNF package. In this example, the NFVO 302 receives or activates a VNF package as part of an on-boarding (i.e., loading) process. The VNF package is provided to the NFVO 302 to configure a network virtualization session or instance. The NFVO 302 communicates with a VNFD 306 to access VNFD parameters 310. The NFVO 302 determines which of the VNFD parameters 310 are dynamic VNFD parameters. The NFVO 302 then interacts with a OAM system 304 to obtain configuration information 320 for the dynamic VNFD parameters.

Figure 4:
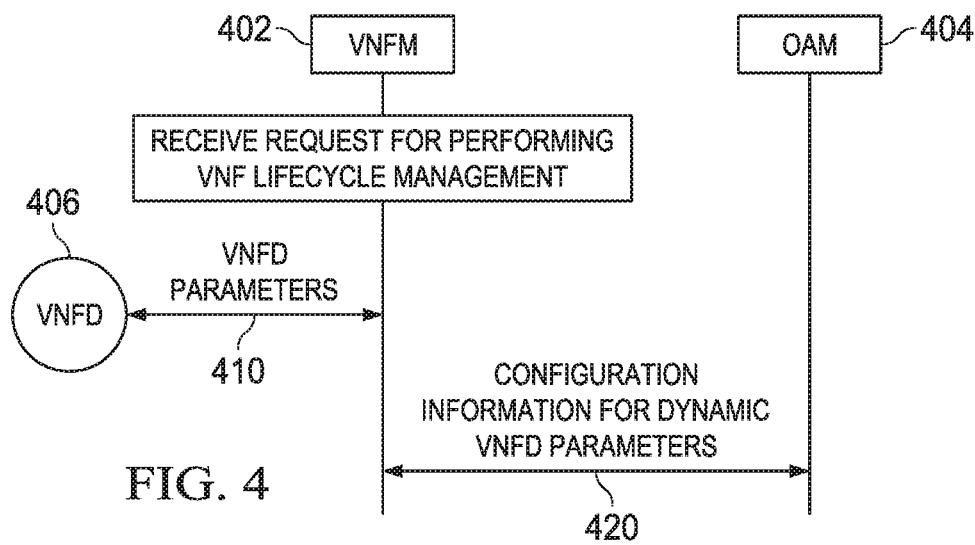
FIG. 4 illustrates a protocol diagram of an embodiment communications sequence for retrieving configuration parameters from an OAM system.

FIG. 4 illustrates a protocol diagram of an embodiment communications sequence for retrieving configuration parameters from an OAM system. A network virtualization system or service with a more flexible and customized VNFD template may perform complex VNF LCM applications. The request for performing VNF LCM is provided to the VNFM 402 to configure a network virtualization session or instance. The VNFM 402 communicates with a VNFD 406 to access VNFD parameters 410. The VNFM 402 determines which of the VNFD parameters 410 are dynamic VNFD parameters. The VNFM 402 then interacts with an OAM system 404 to obtain configuration information 420 for the dynamic VNFD parameters.

Figure 5:
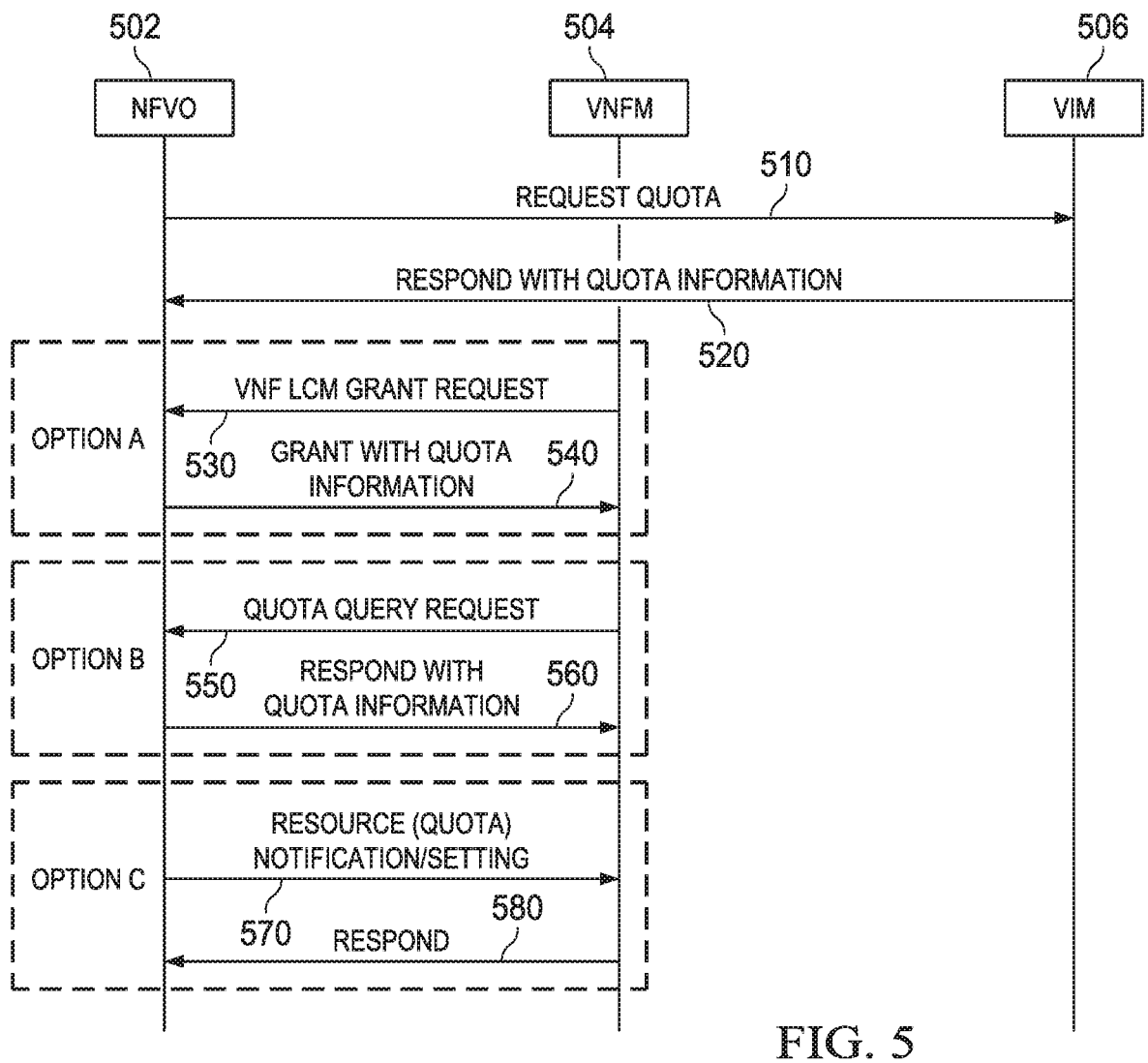
FIG. 5 illustrates a protocol diagram of a communications sequence for establishing a quota for a VNF instance.

FIG. 5 illustrates a protocol diagram of a communications sequence for establishing a quota for a VNF instance. As shown, the communications sequence begins when the NFVO sends a quota request 510 to a VIM 506. The quota request 510 may request quota information for one or more VNF instances. The VIM 506 may return a quota response 520 to the NFVO 502 that includes the requested quota information. The NFVO 502 may then use the quota information to assign quotas to one or more VNF instances. Once the quota response 520 has been communicated from the VIM 506 to the NFVO 502, there may be various ways for allocating quotas to a given VNF instance. In one embodiment, the VNFM 504 sends a VNF lifecycle management (LCM) grant request 530 to the NFVO 502. In such an embodiment, the NFVO 502 may return a grant 540 to the VNFM 504 that includes a quota for a given VNF instance.

In another embodiment, the VNFM 504 sends a quota query request 550 to the NFVO 502. In such an embodiment, the NFVO 502 may return a response 560 that includes a quota for a given VNF instance. In another embodiment, the NFVO 502 sends a resource notification message 570 to the VNFM 504 that specifies a quota for a given VNF instance. The VNFM 504 then returns a response 580 to the NFVO.

Figure 6:
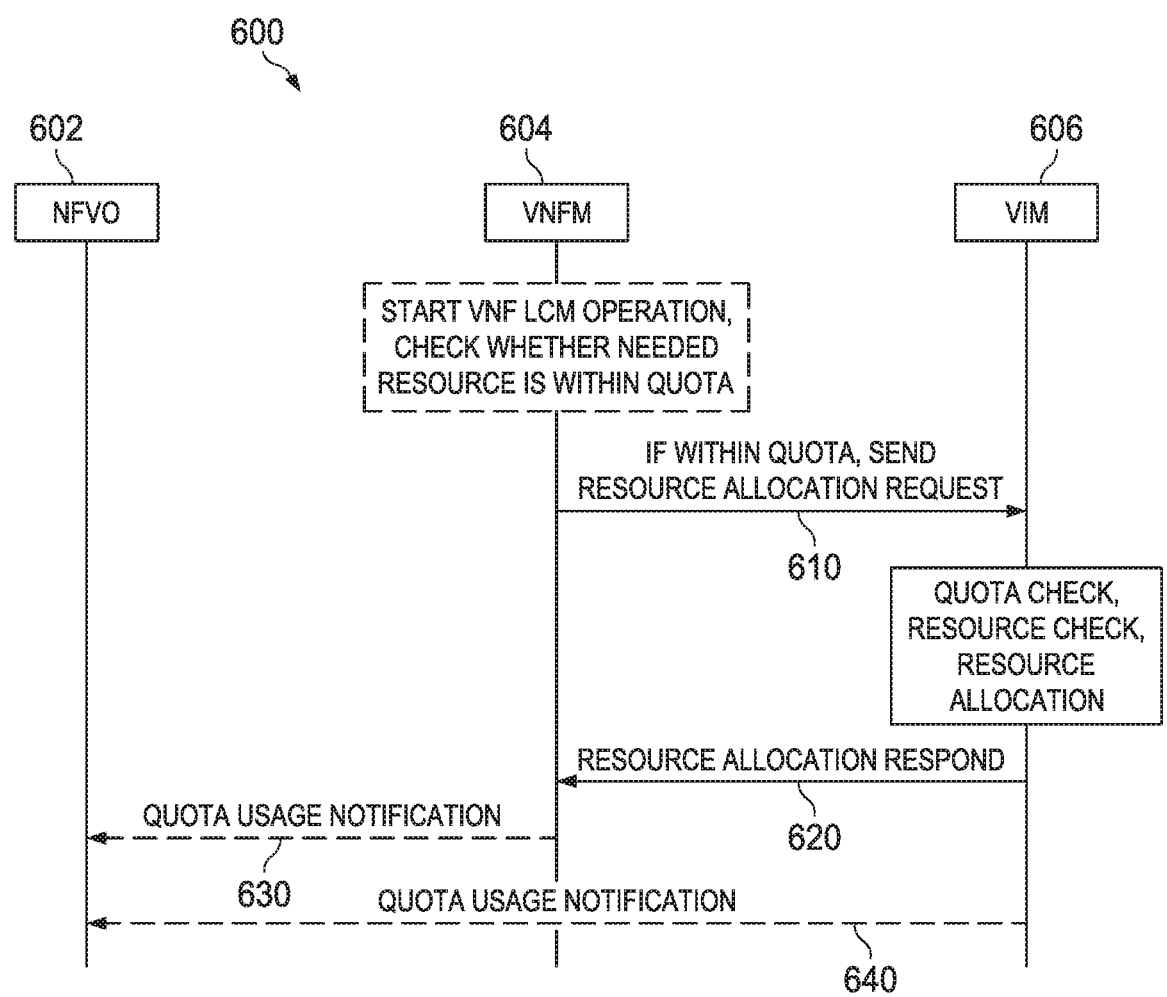
FIG. 6 illustrates a protocol diagram of a communications sequence for allocating resources to a VNF instance based on a quota.

FIG. 6 illustrates a protocol diagram of a communications sequence 600 for allocating resources to a VNF instance based on a quota. As shown, the communications sequence 600 begins when the VNFM 604 begins a VNF LCM operation, at which time the VNFM 604 determines that the number of resources required by the VNF instance is less than or equal to the maximum amount of resources specified by a corresponding quota. Thereafter, the VNFM 605 sends a resource allocation request 610 to the VIM 606 to request that a number of resources be allocated to the VNF instance. The number of resources requested by the resource allocation request 610 is less than or equal to a maximum number of resources specified by the corresponding quota. After verifying that the number of resources requested by the resource allocation request 610 is less than or equal to a maximum number of resources specified by the quota, the VIM 606 sends a resource allocation response 620 to the VNFM to indicate that the resource request has been approved. The VNFM 604 and the VIM 606 then send quota usage notifications 630, 640 to the NFVO 602 to notify the NFVO 602 of how many resources have been allocated to the corresponding VNF instance.

Figure 7:
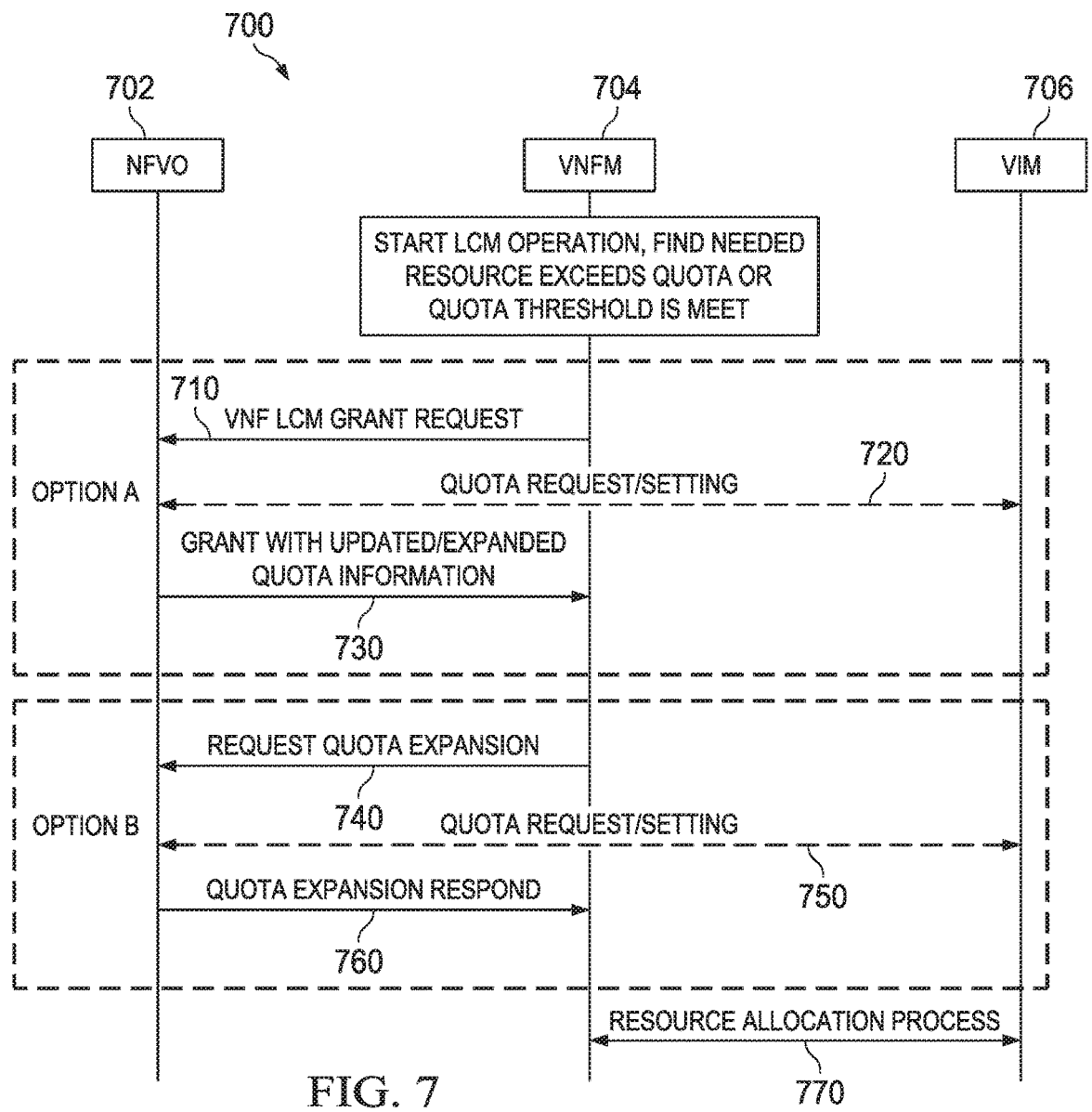
FIG. 7 illustrates a protocol diagram of a communications sequence for increasing the size of a quota.

FIG. 7 illustrates a protocol diagram of a communications sequence 700 for increasing the size of a quota. As shown, the communications sequence 700 begins when the VNFM 704 starts a VNF LCM operation, at which time the VNFM 704 determines that the number of resources required by the corresponding VNF instance exceeds the maximum amount of resources specified by the corresponding quota. The VNFM 704 then requests that the quota be increased. There are various ways of doing this. In one embodiment, the VNFM 704 sends a VNF LCM grant request 710 to the NFVO 702 to request that the quota size be increased. The NFVO 702 and the VIM 706 then exchange request/response messages 720 to update the quota, after which the NFVO 702 sends a grant 730 to the VNFM 704. The grant 730 includes updated/expanded quota information.

In another embodiment, the VNFM 704 sends a request quota expansion message 740 to the NFVO 702 to request that the quota size be increased. The NFVO 702 and the VIM 706 then exchange request/response messages 750 to update the quota, after which the NFVO 702 sends a quota expansion response message 760 to the VNFM 704. The quota expansion response message 760 includes updated/expanded quota information. After the quota has been increased, the VNFM 704 and VIM 706 exchange resource request/response messages 770 to allocate resources to the VNF instance.

Figure 8:
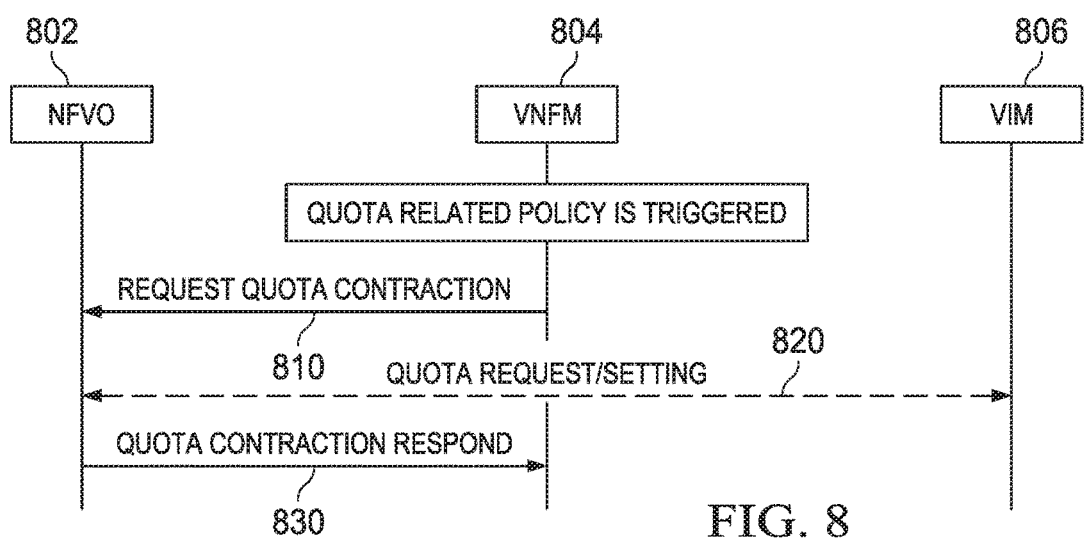
FIG. 8 illustrates a protocol diagram of a communications sequence for reducing the size of a quota.

FIG. 8 illustrates a protocol diagram of a communications sequence 800 for reducing the size of a quota, as may be triggered by a quota related policy. As shown, the VNFM 804 sends a request 810 to the NFVO 802. The request 810 requests that a quota associated with a VNF instance be reduced. Thereafter, the NFVO 802 and the VIM 806 exchange request/response messages 820 to reduce the size of the quota, after which the NFVO 802 sends a quota contraction response 830 to the VNFM 804.

Figure 9:
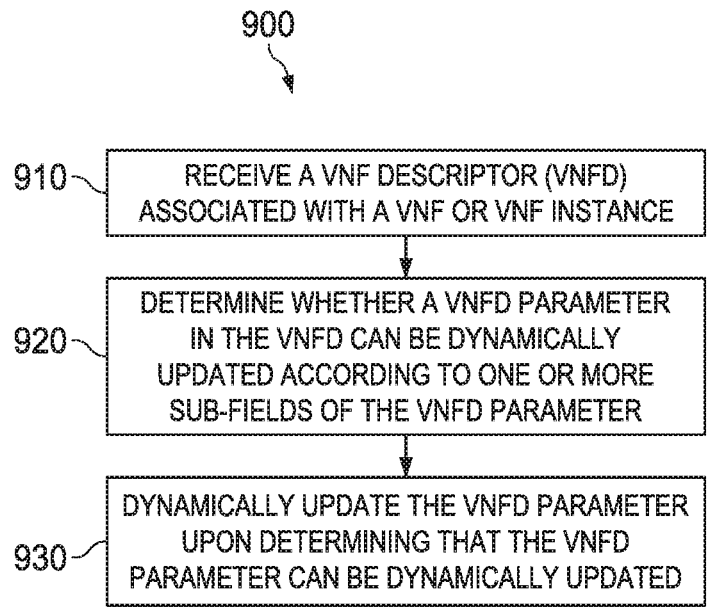
FIG. 9 illustrates a flowchart of an embodiment method for dynamically updating a VNF descriptor (VNFD) parameters.

FIG. 9 illustrates a flowchart of an embodiment method 900 for dynamically updating a VNF descriptor (VNFD) parameters, as may be performed by a management entity. At step 910, the management entity receives a VNFD associated with a VNF or VNF instance. At step 920, the management entity determines whether a VNFD parameter in the VNFD can be dynamically updated according to one or more sub-fields of the VNFD parameter. In an embodiment, the VNFD parameter includes a parameter subfield, a write-ability subfield, an access permission subfield, an administrative priority subfield, and/or a constraints subfield. The parameter subfield indicates a name of the VNFD parameter. The write-ability subfield indicates whether the VNFD parameter is a dynamic/configurable VNFD parameter or a fixed/static VNFD parameter. Dynamic/configurable VNFD parameters are writeable, meaning that they are capable of being dynamically updated. Static VNFD parameters are read only. The access permission subfield identifies which entities are permitted to update the VNFD parameter. The administrative priority subfield indicates the priority of the most recent entity to update the subfield. The constraints subfield indicates one or more conditions that are required to occur in order for the VNFD parameter to be updated. At step 930, the management entity updates the VNFD parameter.

Figure 10:
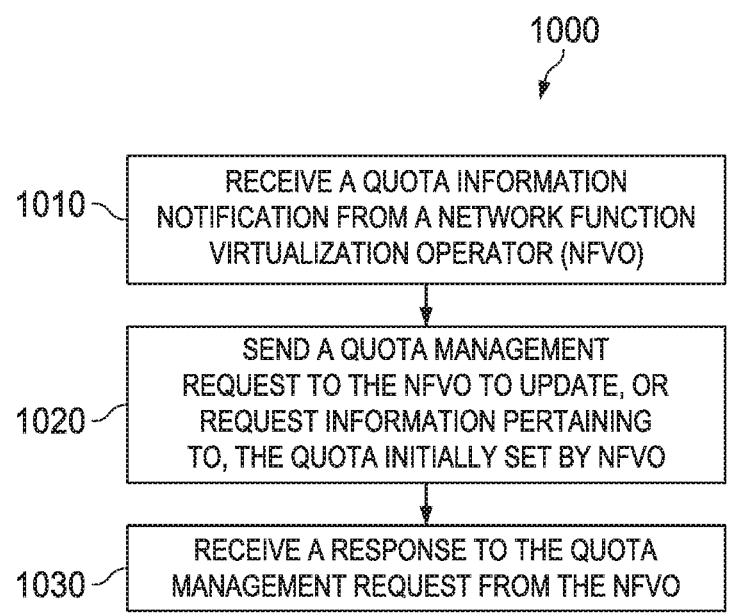
FIG. 10 illustrates a flowchart of an embodiment method for managing quotas.

FIG. 10 illustrates a flowchart of an embodiment method 1000 for managing quotas, as may be performed by a VNFM. At step 1010, the VNFM receives a quota information notification from a network function virtualization operator (NFVO). The quota information notification corresponds to a quota allocated to the VNFM or to one or more VNF instances managed by the VNFM. At step 1020, the VNFM sends a quota management request to the NFVO to update, or request information pertaining to, the quota initially set by NFVO. At step 1030, the NFVM receives a response to the quota management request from the NFVO.

In some embodiments, a VnfConfigurableProperties information element defines configurable properties of a VNF or VNF instance. For a VNF instance, the value of these properties may be modified by a VNFM. Table 1 includes some attributes of the VnfConfigurableProperties information element.

TABLE 1

| Attribute | Qualifier | Cardinality | Content | Description |
|---|---|---|---|---|
| autoScalable | M | 0 . . . 1 | | It permits to enable/disable the auto-scaling functionality. See note 1, note 2. |
| autoHealable | M | 0 . . . 1 | | It permits to enable/disable the auto-healing functionality. See note 1, note 2. | note 1:
A cardinality of "0" indicates that configuring this present VNF property is not supported.
note 2:
The exact data structure describing the attribute is left for data model solution specification, but it should include: name, and any constraints on the values, such as ranges, predefined values, etc.

Figure 11:
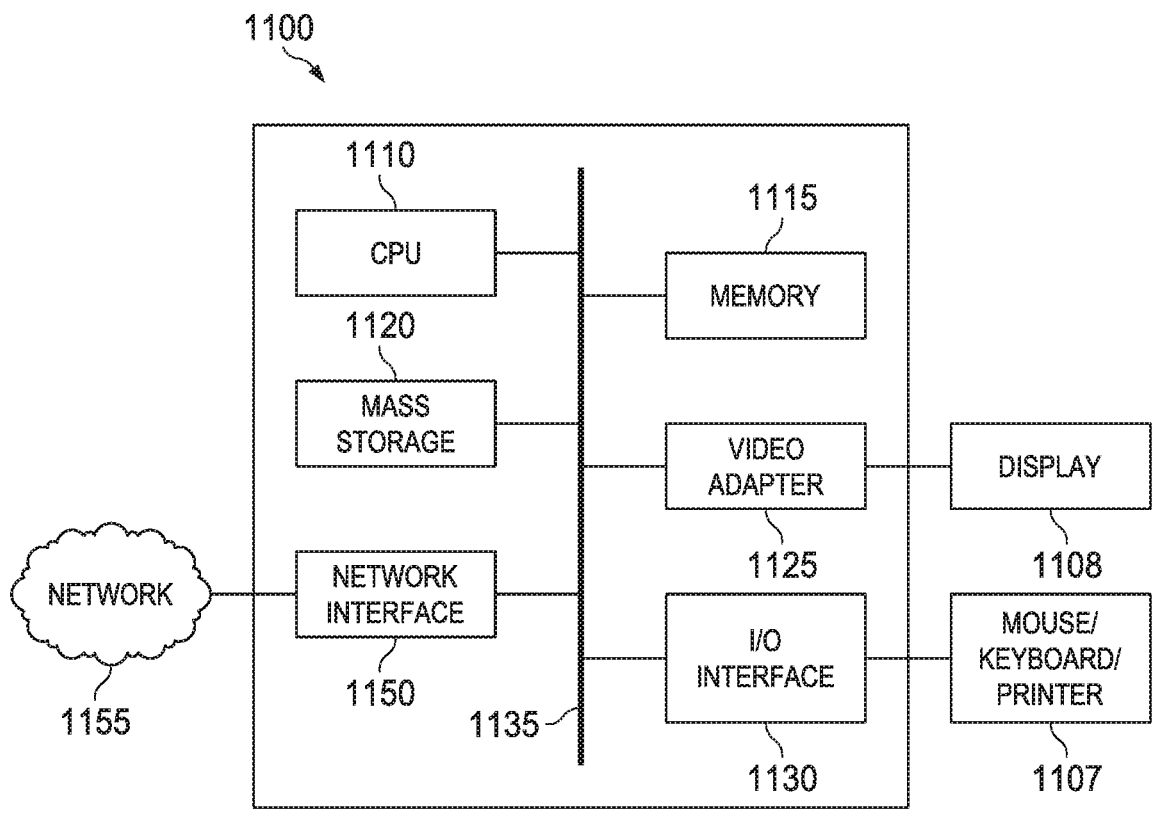
FIG. 11 illustrates a block diagram of a processing system.

FIG. 11 is a block diagram of a processing system 1100 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 1100 may comprise a processing unit equipped with one or more input/output devices, such as a speaker, microphone, mouse, touchscreen, keypad, keyboard, printer, 1107, a display 1108, and the like. The processing unit may include a central processing unit (CPU) 1110, memory 1115, a mass storage device 1120, a video adapter 1125, and an I/O interface 1130 connected to a bus 1135.

The bus 1135 may be one or more of any type of several bus architectures including a memory bus or memory controller, a peripheral bus, video bus, or the like. The CPU 1110 may comprise any type of electronic data processor. The memory 1115 may comprise any type of non-transitory system memory such as static random access memory (SRAM), dynamic random access memory (DRAM), synchronous DRAM (SDRAM), read-only memory (ROM), a combination thereof, or the like. In an embodiment, the memory 1115 may include ROM for use at boot-up, and DRAM for program and data storage for use while executing programs.

The mass storage device 1120 may comprise any type of non-transitory storage device configured to store data, programs, and other information and to make the data, programs, and other information accessible via the bus 1135. The mass storage device 1120 may comprise, for example, one or more of a solid state drive, hard disk drive, a magnetic disk drive, an optical disk drive, or the like.

The video adapter 1125 and the I/O interface 1130 provide interfaces to couple external input and output devices to the processing unit. As illustrated, examples of input and output devices include the display 1107 coupled to the video adapter 1125 and the mouse/keyboard/printer 1105 coupled to the I/O interface 1130. Other devices may be coupled to the processing unit, and additional or fewer interface devices may be utilized. For example, a serial interface such as Universal Serial Bus (USB) (not shown) may be used to provide an interface for a printer.

The processing system 1100 also includes one or more network interfaces 1150, which may comprise wired links, such as an Ethernet cable or the like, and/or wireless links to access nodes or different networks 1155. The network interface 1150 allows the processing system 1100 to communicate with remote units via the network(s) 1155. For example, the network interface 1150 may provide wireless communication via one or more transmitters/transmit antennas and one or more receivers/receive antennas. In an embodiment, the processing system 1100 is coupled to a local-area network or a wide-area network 1155 for data processing and communications with remote devices, such as other processing units, the Internet, remote storage facilities, or the like.

Figure 12:
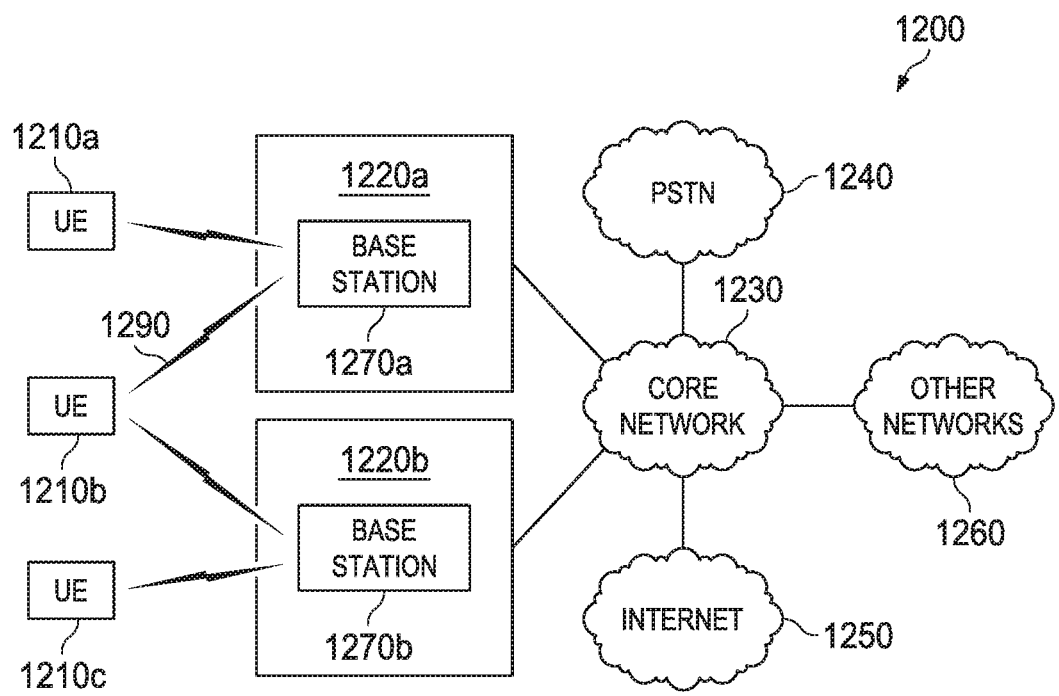
FIG. 12 illustrates a diagram of an embodiment wireless communications system.

FIG. 12 illustrates an example communication system 1200 that may be used for implementing the devices and methods disclosed herein. In general, the system 1200 enables multiple wireless users to transmit and receive data and other content. The system 1200 may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 1200 includes user equipments (UE) 1210a-1210c, radio access networks (RANs) 1220a-1220b, a core network 1230, a public switched telephone network (PSTN) 1240, the Internet 1250, and other networks 1260. While certain numbers of these components or elements are shown in FIG. 12, any number of these components or elements may be included in the system 1200.

The UEs 1210a-1210c are configured to operate and/or communicate in the system 1200. For example, the UEs 1210a-1210c are configured to transmit and/or receive wireless signals or wired signals. Each UE 1210a-1210c represents any suitable end user device and may include such devices (or may be referred to) as a user equipment/device (UE), wireless transmit/receive unit (WTRU), mobile station, fixed or mobile subscriber unit, pager, cellular telephone, personal digital assistant (PDA), smartphone, laptop, computer, touchpad, wireless sensor, or consumer electronics device.

The RANs 1220a-1220b here include base stations 1270a-1270b, respectively. Each base station 1270a-1270b is configured to wirelessly interface with one or more of the UEs 1210a-1210c to enable access to the core network 1230, the PSTN 1240, the Internet 1250, and/or the other networks 1260. For example, the base stations 1270a-1270b may include one or more of several well-known devices, such as a base transceiver station (BTS), a Node-B (NodeB), an evolved NodeB (eNodeB), a Home NodeB, a Home eNodeB, a small/femto/pico or similar cell, a site controller, an access point (AP), or a wireless router, or a server, router, switch, or other processing entity with a wired or wireless network.

In the embodiment shown in FIG. 12, the base station 1270a forms part of the RAN 1220a, which may include other base stations, elements, and/or devices. Also, the base station 1270b forms part of the RAN 1220b, which may include other base stations, elements, and/or devices. Each base station 1270a-1270b operates to transmit and/or receive wireless signals within a particular geographic region or area, sometimes referred to as a "cell." In some embodiments, multiple-input multiple-output (MIMO) technology may be employed having multiple transceivers for each cell.

The base stations 1270a-1270b communicate with one or more of the UEs 1210a-1210c over one or more air interfaces 1290 using wireless communication links. The air interfaces 1290 may utilize any suitable radio access technology.

It is contemplated that the system 1200 may use multiple channel access functionality, including such schemes as described above. In particular embodiments, the base stations and UEs are configured to implement the Long Term Evolution wireless communication standard (LTE), LTE Advanced (LTE-A), and/or LTE Broadcast (LTE-B). In other embodiments, the base stations and UEs are configured to implement UMTS, HSPA, or HSPA+ standards and protocols. Of course, other multiple access schemes and wireless protocols may be utilized.

The RANs 1220a-1220b are in communication with the core network 1230 to provide the UEs 1210a-1210c with voice, data, application, Voice over Internet Protocol (VoIP), or other services. Understandably, the RANs 1220a-1220b and/or the core network 1230 may be in direct or indirect communication with one or more other RANs (not shown). The core network 1230 may also serve as a gateway access for other networks (such as PSTN 1240, Internet 1250, and other networks 1260). In addition, some or all of the UEs 1210a-1210c may include functionality for communicating with different wireless networks over different wireless links using different wireless technologies and/or protocols.

Although FIG. 12 illustrates one example of a communication system, various changes may be made to FIG. 12. For example, the communication system 1200 could include any number of UEs, base stations, networks, or other components in any suitable configuration.

Figure 13:
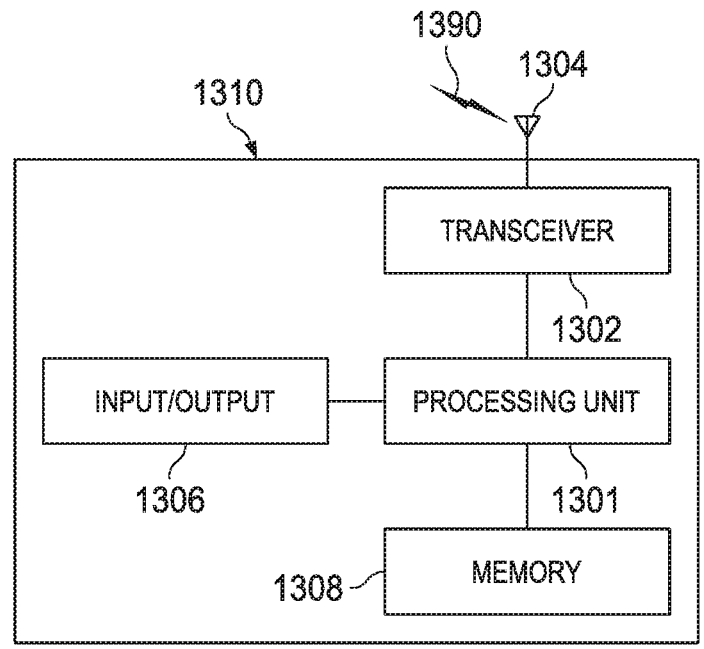
FIG. 13 illustrates a diagram of an embodiment user equipment (UE)
Figure 14:
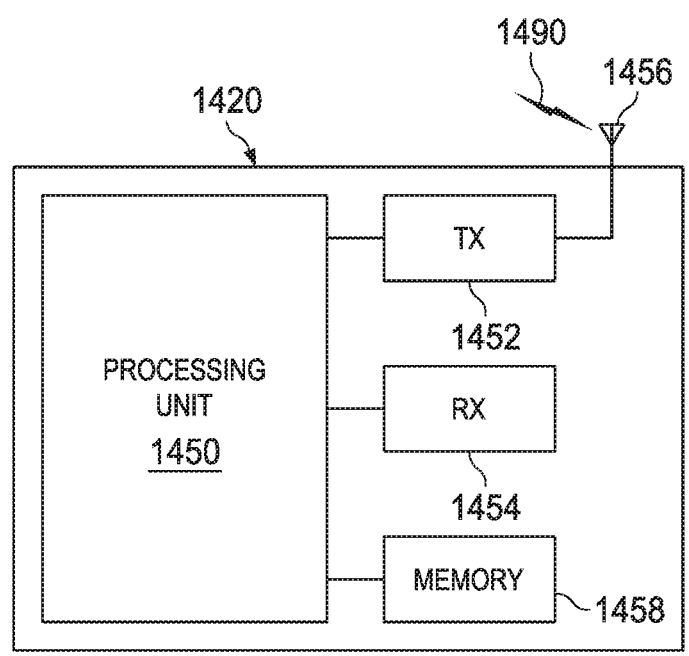
FIG. 14 illustrates a diagram of an embodiment base station.

FIGS. 13 and 14 illustrate example devices that may implement the methods and teachings according to this disclosure. In particular, FIG. 13 illustrates an example UE 1310, and FIG. 14 illustrates an example base station 1420.

As shown in FIG. 13, the UE 1310 includes at least one processing unit 1301, a transceiver 1302, an antenna 1304, an input/output interface 1306, and a memory 1308. The antenna 1304 is configured to communicate a wireless signal 1390. The processing unit 1301 implements various processing operations of the UE 1310. For example, the processing unit 1301 could perform signal coding, data processing, power control, input/output processing, or any other functionality enabling the UE 1310 to operate in a system. The processing unit 1301 also supports the methods and teachings described in more detail above. Each processing unit 1301 includes any suitable processing or computing device configured to perform one or more operations. Each processing unit 1301 could, for example, include a microprocessor, microcontroller, digital signal processor, field programmable gate array, or application specific integrated circuit.

The UE 1310 also includes at least one transceiver 1302. The transceiver 1302 is configured to modulate data or other content for transmission by at least one antenna 1304. The transceiver 1302 is also configured to demodulate data or other content received by the at least one antenna 1304. Each transceiver 1302 includes any suitable structure for generating signals for wireless transmission and/or processing signals received wirelessly. Each antenna 1304 includes any suitable structure for transmitting and/or receiving wireless signals. One or multiple transceivers 1302 could be used in the UE 1310, and one or multiple antennas 1304 could be used in the UE 1310. Although shown as a single functional unit, a transceiver 1302 could also be implemented using at least one transmitter and at least one separate receiver.

The UE 1310 further includes one or more input/output devices 1306. The input/output devices 1306 facilitate interaction with a user. Each input/output device 1306 includes any suitable structure for providing information to or receiving information from a user, such as a speaker, microphone, keypad, keyboard, display, or touch screen.

In addition, the UE 1310 includes at least one memory 1308. The memory 1308 stores instructions and data used, generated, or collected by the UE 1310. For example, the memory 1308 could store software or firmware instructions executed by the processing unit(s) 1301 and could store data used to reduce or eliminate interference in incoming signals. The at least one memory 1308 can comprise one or more storage devices and can include any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like. The UE 1310 can be implemented by the processing system 110 of FIG. 11 in some examples As shown in FIG. 14, the base station 1420 includes at least one processing unit 1450, at least one transmitter (TX) 1452, at least one receiver (RX) 1454, one or more antennas 1456, and at least one memory 1458. The processing unit 1450 implements various processing operations of the base station 1420, such as signal coding, data processing, power control, input/output processing, or any other functionality. The processing unit 1450 can also support the methods and teachings described in more detail above. Each processing unit 1450 includes any suitable processing or computing device configured to perform one or more operations. Each processing unit 1450 could, for example, include a microprocessor, microcontroller, digital signal processor, field programmable gate array, or application specific integrated circuit.

Each transmitter 1452 includes any suitable structure for generating signals for wireless transmission to one or more UEs or other devices. Each receiver 1454 includes any suitable structure for processing signals received wirelessly from one or more UEs or other devices. Although shown as separate components, at least one transmitter 1452 and at least one receiver 1454 could be combined into a transceiver (TX/RX). Each antenna 1456 includes any suitable structure for transmitting and/or receiving wireless signals. While a common antenna 1456 is shown here as being coupled to both the transmitter 1452 and the receiver 1454, one or more antennas 1456 could be coupled to the transmitter(s) 1452, and one or more separate antennas 1456 could be coupled to the receiver(s) 1454. Each memory 1458 includes any suitable volatile and/or non-volatile storage and retrieval device(s). The base station 1420 can be implemented by the processing system 110 of FIG. 11 in some examples.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for dynamically configuring virtual network function (VNF) parameters, the method comprising:
   receiving, by a VNF manager (VNFM), a VNF descriptor (VNFD) information element associated with a VNF or VNF instance, the VNFD information element including a VNF parameter describing characteristics of the VNF or VNF instance and a VnfConfigurableProperties information element defining one or more configurable VNF parameters that are configurable by the VNFM, the one or more configurable VNF parameters defined by the VnfConfigurableProperties information element as being configurable by the VNFM including at least one of an autoScalable Attribute or an autoHealable Attribute; and
   determining, by the VNFM, that the VNF parameter in the VNFD information element is configurable according to the VnfConfigurableProperties information element in the VNFD information element; and
   re-configuring, by the VNFM, a value of the VNF parameter in the VNFD information element when the VNF parameter is configurable.

2. The method of claim 1, wherein the VnfConfigurableProperties information element indicates that the VNF parameter can be re-configured.

3. The method of claim 1, wherein determining that the VNF parameter is configurable comprises:
   determining that the VNF parameter is defined by the VnfConfigurableProperties information element as being configurable by the VNFM.

4. The method of claim 1, further comprising:
   determining that the VNFM has been authorized to update the VNF parameter according to an access permission sub-field of the VNFD information element.

5. The method of claim 1, further comprising:
   determining that the VNFM has a higher administrative priority than an entity that set the original value of the VNF parameter according to an administrative priority sub-field of the VNFD information element.

6. The method of claim 1, further comprising:
   determining that one or more conditions specified by a constraints sub-field of the VNF parameter have occurred within a threshold period of time prior to determining that the VNF parameter is configurable.

7. The method of claim 1, wherein the re-configured value of the VNF parameter indicates a modification to a characteristic of the VNF or VNF instance.

8. The method of claim 7, wherein the re-configured value of the VNF parameter indicates an increase or a decrease in a number of virtual deployment units (VDUs), a number of virtual links, or a number of connection points in the VNF or VNF instance.

9. The method of claim 7, wherein the re-configured value of the VNF parameter indicates an increase or decrease in a resource quota of the VNF or VNF instance, the resource quota specifying a maximum number of resources that can be allocated to the VNF or VNF instance.

10. The method of claim 1, wherein the VNFD information element is received from a network function virtualization operator (NFVO).

11. The method of claim 1, wherein the one or more configurable VNF parameters defined by the VnfConfigurableProperties information element as being configurable by the VNFM includes the autoScalable Attribute, and wherein reconfiguration of the autoScalable Attribute enables or disables auto-scaling functionality.

12. The method of claim 11, wherein reconfiguring the VNF parameter comprises enabling the autoScalable Attribute.

13. The method of claim 11, wherein re-configuring the VNF parameter comprises disabling the autoScalable Attribute.

14. The method of claim 1, wherein the one or more configurable VNF parameters defined by the VnfConfigurableProperties information element as being configurable by the VNFM includes the autoHealable Attribute, and wherein reconfiguration of the autoHealable Attribute or disables auto-healing functionality.

15. The method of claim 14, wherein re-configuring the VNF parameter comprises enabling the autoHealable Attribute.

16. The method of claim 14, wherein re-configuring the VNF parameter comprises disabling the autoHealable Attribute.

17. An apparatus supporting a virtual network function (VNF) manager (VNFM), the apparatus comprising:
   a processor; and
   a non-transitory computer readable storage medium storing programming for execution by the processor, the programming causing the VNFM to:
   receive a VNF descriptor (VNFD) information element associated with a VNF or VNF instance, the VNFD information element including a VNF parameter describing characteristics of the VNF or VNF instance and a VnfConfigurableProperties information element defining one or more configurable VNF parameters that are configurable by the VNFM, the one or more configurable VNF parameters defined by the VnfConfigurableProperties information element as being configurable by the VNFM including at least one of an autoScalable Attribute or an autoHealable Attribute; and determine that the VNF parameter in the VNFD information element is configurable according to the VnfConfigurableProperties information element in the VNFD information element; and re-configure a value of the VNF parameter in the VNFD information element when the VNF parameter is configurable.

18. The apparatus of claim 17, wherein the VnfConfigurableProperties information element indicates that the VNF parameter can be re-configured.

19. The apparatus of claim 17, wherein the VNFM determines that the VNF parameter is configurable by determining that the VNF parameter is defined by the VnfConfigurableProperties information element as being configurable by the VNFM.

20. The apparatus of claim 17, wherein the programming further causes the VNFM to determine that the VNFM has been authorized to update the VNF parameter according to an access permission sub-field of the VNFD information element.

21. The apparatus of claim 17, wherein the programming further causes the VNFM to determine that the VNFM has a higher administrative priority than an entity that set the original value of the VNF parameter according to an administrative priority sub-field of the VNFD information element.

22. The apparatus of claim 17, wherein the programming further causes the VNFM to determine that one or more conditions specified by a constraints sub-field of the VNF parameter have occurred within a threshold period of time prior to determining that the VNF parameter is configurable.

23. The apparatus of claim 22, wherein the re-configured value of the VNF parameter indicates a modification to a characteristic of the VNF or VNF instance.

24. The apparatus of claim 22, wherein the re-configured value of the VNF parameter indicates an increase or a decrease in a number of virtual deployment units (VDUs), a number of virtual links, or a number of connection points in the VNF or VNF instance.

25. The apparatus of claim 17, wherein the re-configured value of the VNF parameter indicates an increase or decrease in a resource quota of the VNF or VNF instance, the resource quota specifying a maximum number of resources that can be allocated to the VNF or VNF instance.

26. The apparatus of claim 17, wherein the VNFD information element is received from a network function virtualization operator (NFVO).

27. The apparatus of claim 17, wherein the one or more configurable VNF parameters defined by the VnfConfigurableProperties information element as being configurable by the VNFM includes the autoScalable Attribute, and wherein reconfiguration of the autoScalable Attribute enables or disables auto-scaling functionality.

28. The apparatus of claim 27, wherein the instructions to re-configure the VNF parameter includes instructions to enable the autoScalable Attribute.

29. The apparatus of claim 27, wherein the instructions to re-configure the VNF parameter includes instructions to disable the autoScalable Attribute.

30. The apparatus of claim 17, wherein the one or more configurable VNF parameters defined by the VnfConfigurableProperties information element as being configurable by the VNFM includes the autoHealable Attribute, and wherein reconfiguration of the autoHealable Attribute or disables auto-healing functionality.

31. The apparatus of claim 30, wherein the instructions to re-configure the VNF parameter includes instructions to enable the autoHealable Attribute.

32. The apparatus of claim 30, wherein the instructions to re-configure the VNF parameter includes instructions to disable the autoHealable Attribute.

* * * * *